(12) United States Patent
Fearn et al.

(10) Patent No.: US 8,316,381 B2
(45) Date of Patent: *Nov. 20, 2012

(54) GRAPHICS FOR END TO END COMPONENT MAPPING AND PROBLEM-SOLVING IN A NETWORK ENVIRONMENT

(75) Inventors: Paul Fearn, Raleigh, NC (US); Stig Arne Olsson, Apex, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

This patent is subject to a terminal disclaimer.

(21) Appl. No.: 12/102,357

(22) Filed: Apr. 14, 2008

(65) Prior Publication Data

US 2008/0216095 A1    Sep. 4, 2008

Related U.S. Application Data

(63) Continuation of application No. 10/125,619, filed on Apr. 18, 2002, now Pat. No. 7,412,502.

(51) Int. Cl.
G06F 9/04    (2006.01)
(52) U.S. Cl. .................. 719/318; 719/317; 714/47.1
(58) Field of Classification Search .................. None
See application file for complete search history.

(56) References Cited

U.S. PATENT DOCUMENTS

| | | |
|---|---|---|
| 5,295,244 A | 3/1994 | Dev et al. |
| 5,459,837 A | 10/1995 | Caccavale |
| 5,504,921 A | 4/1996 | Dev et al. |
| 5,581,482 A | 12/1996 | Wiedenman et al. |
| 5,696,701 A | 12/1997 | Burgess et al. |
| 5,742,819 A | 4/1998 | Caccavale |
| 5,787,254 A | 7/1998 | Maddalozzo, Jr. et al. |
| 5,793,753 A | 8/1998 | Hershey et al. |
| 5,812,780 A | 9/1998 | Chen et al. |
| 5,835,756 A | 11/1998 | Caccavale |
| 5,872,973 A | 2/1999 | Mitchell et al. |
| 5,944,782 A | 8/1999 | Noble et al. |

(Continued)

FOREIGN PATENT DOCUMENTS

AU    2001291148    4/2002

OTHER PUBLICATIONS

HP, HP OpenView Enhances integration with CiscoWorks2000 to provide comprehensive solutions for managing network service infrastructure, Oct. 24, 2000, Pages All.*

(Continued)

*Primary Examiner* — S. Sough
*Assistant Examiner* — Syed Roni
(74) *Attorney, Agent, or Firm* — Stephen J. Walder, Jr.; Mark C. Vallone

(57) ABSTRACT

An example of a solution provided here comprises receiving as input at least one event (chosen from an event generated by an application probe, and an event generated by a component probe), and providing graphical output based on the inputs, whereby a user correlates a component problem with a performance problem affecting an application. Methods connected with graphics for end to end component mapping and problem-solving in a network environment, systems for executing such methods, and instructions on a computer-usable medium, for executing such methods, are provided.

14 Claims, 7 Drawing Sheets

U.S. PATENT DOCUMENTS

| | | | |
|---|---|---|---|
| 5,978,475 | A | 11/1999 | Schneier et al. |
| 6,000,045 | A | 12/1999 | Lewis |
| 6,041,349 | A | 3/2000 | Sugauchi et al. |
| 6,041,352 | A | 3/2000 | Burdick et al. |
| 6,052,733 | A | 4/2000 | Mahalingam et al. |
| 6,055,493 | A | 4/2000 | Ries et al. |
| 6,070,190 | A | 5/2000 | Reps et al. |
| 6,078,956 | A | 6/2000 | Bryant et al. |
| 6,092,113 | A | 7/2000 | Maeshima et al. |
| 6,108,700 | A | 8/2000 | Maccabee et al. |
| 6,112,236 | A | 8/2000 | Dollin et al. |
| 6,141,699 | A | 10/2000 | Luzzi et al. |
| 6,151,688 | A | 11/2000 | Wipfel et al. |
| 6,163,775 | A | 12/2000 | Wlaschin et al. |
| 6,167,445 | A | 12/2000 | Gai et al. |
| 6,175,832 | B1 | 1/2001 | Luzzi et al. |
| 6,177,886 | B1 | 1/2001 | Billington et al. |
| 6,182,125 | B1 | 1/2001 | Borella et al. |
| 6,219,705 | B1 | 4/2001 | Steinberger et al. |
| 6,243,396 | B1 | 6/2001 | Somers |
| 6,260,070 | B1 | 7/2001 | Shah |
| 6,269,330 | B1 | 7/2001 | Cidon et al. |
| 6,278,694 | B1 | 8/2001 | Wolf et al. |
| 6,278,966 | B1 | 8/2001 | Howard et al. |
| 6,279,002 | B1 | 8/2001 | Lenz et al. |
| 6,321,264 | B1 | 11/2001 | Fletcher et al. |
| 6,327,550 | B1 | 12/2001 | Vinberg et al. |
| 6,336,138 | B1 | 1/2002 | Caswell et al. |
| 6,349,325 | B1 | 2/2002 | Newcombe et al. |
| 6,351,771 | B1 | 2/2002 | Craddock et al. |
| 6,356,205 | B1 | 3/2002 | Salvo et al. |
| 6,397,359 | B1 | 5/2002 | Chandra et al. |
| 6,401,119 | B1 | 6/2002 | Fuss et al. |
| 6,418,467 | B1 | 7/2002 | Schweitzer et al. |
| 6,425,006 | B1 | 7/2002 | Chari et al. |
| 6,430,712 | B2 | 8/2002 | Lewis |
| 6,442,615 | B1 | 8/2002 | Nordenstam et al. |
| 6,449,739 | B1 | 9/2002 | Landan |
| 6,457,143 | B1 | 9/2002 | Yue |
| 6,499,117 | B1 | 12/2002 | Tanaka |
| 6,505,244 | B1 | 1/2003 | Natarajan |
| 6,510,463 | B1 | 1/2003 | Farhat et al. |
| 6,529,475 | B1 | 3/2003 | Wan et al. |
| 6,550,024 | B1 | 4/2003 | Pagurek et al. |
| 6,553,568 | B1 | 4/2003 | Fijolek et al. |
| 6,556,659 | B1 | 4/2003 | Bowman-Amuah |
| 6,584,108 | B1 | 6/2003 | Chung et al. |
| 6,587,878 | B1 | 7/2003 | Merriam |
| 6,606,581 | B1 | 8/2003 | Nickerson et al. |
| 6,654,803 | B1 | 11/2003 | Rochford et al. |
| 6,662,235 | B1 | 12/2003 | Callis et al. |
| 6,701,342 | B1 | 3/2004 | Bartz et al. |
| 6,701,363 | B1 | 3/2004 | Chiu et al. |
| 6,708,137 | B2 | 3/2004 | Carley |
| 6,732,168 | B1 | 5/2004 | Bearden et al. |
| 6,734,878 | B1 | 5/2004 | DeLuca et al. |
| 6,738,933 | B2 | 5/2004 | Fraenkel et al. |
| 6,745,235 | B2 | 6/2004 | Baca et al. |
| 6,751,661 | B1 | 6/2004 | Geddes |
| 6,751,662 | B1 | 6/2004 | Natarajan et al. |
| 6,757,543 | B2 | 6/2004 | Moran et al. |
| 6,760,719 | B1 | 7/2004 | Hanson et al. |
| 6,763,380 | B1 | 7/2004 | Mayton et al. |
| 6,765,864 | B1 | 7/2004 | Natarajan et al. |
| 6,766,278 | B2 | 7/2004 | Liu et al. |
| 6,766,368 | B1 | 7/2004 | Jakobson et al. |
| 6,779,032 | B1 | 8/2004 | Hericourt |
| 6,789,050 | B1 | 9/2004 | Reeser et al. |
| 6,792,455 | B1 | 9/2004 | DeLuca et al. |
| 6,792,459 | B2 | 9/2004 | Elnozahy et al. |
| 6,801,940 | B1 | 10/2004 | Moran et al. |
| 6,807,156 | B1 | 10/2004 | Veres et al. |
| 6,832,341 | B1 | 12/2004 | Vijayan |
| 6,853,619 | B1 | 2/2005 | Grenot |
| 6,857,020 | B1 | 2/2005 | Chaar et al. |
| 6,859,831 | B1 | 2/2005 | Gelvin et al. |
| 6,868,094 | B1 | 3/2005 | Bordonaro et al. |
| 6,871,324 | B2 | 3/2005 | Hand et al. |
| 6,885,302 | B2 | 4/2005 | Seal et al. |
| 6,889,222 | B1 | 5/2005 | Zhao |
| 6,892,235 | B1 | 5/2005 | Daude et al. |
| 6,901,442 | B1 | 5/2005 | Schwaller et al. |
| 6,904,458 | B1 | 6/2005 | Bishop et al. |
| 6,928,471 | B2 | 8/2005 | Pabari et al. |
| 6,934,745 | B2 | 8/2005 | Krautkremer |
| 6,941,358 | B1 | 9/2005 | Joiner et al. |
| 6,944,673 | B2 | 9/2005 | Malan et al. |
| 6,944,798 | B2 | 9/2005 | Stephenson et al. |
| 6,950,868 | B1 | 9/2005 | Faraldo, II |
| 6,973,490 | B1 | 12/2005 | Robertson et al. |
| 6,973,622 | B1 | 12/2005 | Rappaport et al. |
| 6,983,321 | B2 | 1/2006 | Trinon et al. |
| 6,990,433 | B1 | 1/2006 | McCutcheon |
| 6,996,517 | B1 | 2/2006 | Papaefstathiou |
| 7,019,753 | B2 | 3/2006 | Rappaport et al. |
| 7,043,549 | B2 | 5/2006 | Breese et al. |
| 7,047,291 | B2 | 5/2006 | Breese et al. |
| 7,051,098 | B2 | 5/2006 | Masters et al. |
| 7,231,606 | B2 | 6/2007 | Miller et al. |
| 7,260,645 | B2 | 8/2007 | Bays et al. |
| 7,269,651 | B2 | 9/2007 | Olsson et al. |
| 7,363,368 | B2 | 4/2008 | Paulin |
| 7,370,103 | B2 | 5/2008 | Hunt et al. |
| 7,412,502 | B2 | 8/2008 | Fearn et al. |
| 2002/0004828 | A1 | 1/2002 | Davis et al. |
| 2002/0055999 | A1 | 5/2002 | Takeda |
| 2002/0073195 | A1 | 6/2002 | Hellerstein et al. |
| 2002/0087882 | A1 | 7/2002 | Schneier et al. |
| 2002/0097267 | A1 | 7/2002 | Dinan et al. |
| 2002/0099818 | A1 | 7/2002 | Russell et al. |
| 2002/0138571 | A1 | 9/2002 | Trinon et al. |
| 2002/0143788 | A1* | 10/2002 | Hermann et al. ......... 707/103 R |
| 2002/0161875 | A1 | 10/2002 | Raymond |
| 2002/0169870 | A1* | 11/2002 | Vosseler et al. ............... 709/224 |
| 2003/0018450 | A1 | 1/2003 | Carley |
| 2003/0061232 | A1 | 3/2003 | Patterson |
| 2003/0093460 | A1 | 5/2003 | Kinney et al. |
| 2003/0120762 | A1 | 6/2003 | Yepishin et al. |
| 2003/0145079 | A1 | 7/2003 | Breese et al. |
| 2003/0145080 | A1 | 7/2003 | Breese et al. |
| 2003/0167406 | A1 | 9/2003 | Beavers |
| 2003/0191837 | A1 | 10/2003 | Chen |
| 2003/0200293 | A1 | 10/2003 | Fearn et al. |
| 2003/0221000 | A1 | 11/2003 | Cherkasova et al. |
| 2004/0015846 | A1 | 1/2004 | Haisraeli |
| 2004/0064546 | A1 | 4/2004 | Olsson et al. |
| 2004/0078684 | A1 | 4/2004 | Friedman et al. |
| 2004/0176992 | A1 | 9/2004 | Santos et al. |
| 2004/0205100 | A1 | 10/2004 | Olsson et al. |
| 2004/0205184 | A1 | 10/2004 | Olsson et al. |
| 2006/0031469 | A1 | 2/2006 | Clarke et al. |
| 2008/0052141 | A1 | 2/2008 | Olsson et al. |

OTHER PUBLICATIONS

U.S. Appl. No. 10/062,329.
U.S. Appl. No. 10/062,369.
U.S. Appl. No. 10/122,001.
U.S. Appl. No. 10/125,619.
U.S. Appl. No. 10/256,094.
U.S. Appl. No. 10/383,847.
U.S. Appl. No. 10/383,853.
U.S. Appl. No. 10/880,275.
U.S. Appl. No. 11/855,247.
Mercury Interactive Corporation, "Products and Services/Testing", web page available at www.mercuryinteractive.com, 2001.
Mercury Interactive Corporation, "Load Testing Monitors", web page available at www.mercuryinteractive.com, 2001.
Mercury Interactive Corporation, "QuickTest Professional", data sheet available at www.mercuryinteractive.com, 2001.
Atesto Technologies Inc., "How does FunctionChecker work?", web page available at http://www.atesto.com/solutions_func_test_how_it_works.asp, 2001.
Atesto Technologies Inc., "Functional and Regression Testing", web page available at http://www.atesto.com/solutions_automated_fun_test.asp, 2001.

Freshwater Software, "SiteSeer Example Reports", http://www.freshwatersoftware.com/SiteSeerReports.htm, 2001.
Reading Management Reports, web page available at http://demo.freshwater.com/SiteScope/docs/History.htm, 2001.
Holistix, "Holistix Web Manager", web page available at http://www.holistix.net/products/webmgr/., 2001.
Holistix, "Holistix Web Manager Reporting", web page available at http://www.holistix.net/products/webmgr/reporting.html, 2001.
Holistix, "Response time and performance thresholds", web page available at http://www.holistix.net/products/webmgr/url_response_time_chart.html, 2001.
Holistix, "Correlating response time to site availability", web page available at http://www.holistix.net/products/webmgr/avail_by_monitor.html, 2001.
Keynote, "Test Perspective", web page available at http://www.keynote.com/solutions/html/test_works.html, 2001.
Keynote, "The Keynote Solution", web page available at http://www.keynote.com/solutions/html/resource_transaction_perspect.html, 2001.
Tweney, "The Need for Speed", Business 2.0, vol. 2, No. 7, Aug./Sep. 2001, pp. 144-145.
Gaidioz et al., "Synchronizing Network Probes to avoid Measurement Intrusiveness with the Network Weather Service", 2000, www.cs.utk.edu/~rich/publications/nws-period.ps.qz, pp. 1-9.
Clark et al., "Application-Level Measurements of Performance on the vBNS", 1999, www.cs.unc.edu/~jeffay/papers/ICMCS-99.ps, 5 pages.
Sekar et al., "A High-Performance Network Intrusion Detection System", 1999, www.seclab.cs.sunysb.edu/sekar/papers/ccs99.ps, 10 pages.
Adiseshu et al., "A State Management Protocol for IntServ, DiffServ, and Label Switching", 1998, www.ccrc.wustl.edu/~hari/icnp.ps, pp. 1-24.
Craswell, Nick et al., "Which search engine is best at finding airline site home pages?", MCIS Technical Report 01/45, Mar. 29, 2001, pp. 1-7.
Hahn, J. et al., "Measuring and Comparing the Effectiveness of E-Commerce Website Designs", 14th Workshop on Information Systems and Economics (WISE), 2002, 35 pages.
Liu, Bing et al., "Visualizing Web Site Comparisons", Proceedings of the 11th International Conference on World Wide Web, 2002, pp. 693-703.
Subraya, B.M. et al., "Object Driven Performance Testing of Web Applications", Proceedings of the First Asia-Pacific Conference on Quality Software, 2000, pp. 17-26.
Zhang, Ping et al., "Websites that Satisfy Users: A Theoretical Framework for Web User Interface Design and Evaluation", Proceedings of the 32nd Hawaii International Conference on System Sciences, 1999, pp. 1-8.
Office Action mailed Dec. 14, 2010 for U.S. Appl. No. 10/062,369, 23 pages.
Response to Office Action filed with the USPTO on Mar. 11, 2011 for U.S. Appl. No. 10/062,369, 33 pages.
Order Remanding Appeal to Examiner mailed Sep. 20, 2010 for U.S. Appl. No. 10/062,369, 3 pages.
Paxson et al., "An Architecture for Large-Scale Internet Measurement", 1998, ftp.ee.lbl.gov/papers/nimi-ieee-comm98.ps.qz, pp. 1-9.
Phillips et al., "The FERET Evaluation Methodology for Face-Recognition Algorithms", 1999, sequoyah.ncsl.nist.gov/pub/nist_internal_reports/ir_6264.ps.Z, pp. 1-20.
Ruspini et al., "The Haptic Display of Complex Graphical Environments", 1997, robotics.stanford.edu/people/krasi/Siggraph97.ps.Z, 8 pages.
Blott et al., "User-Level Billing and Accounting in IP Networks", 1999, www.bell-labs.com/user/blott/BLTJ00.pdf, pp. 1-15.
Dykes et al., "An Empirical Evaluation of Client-side Server Selection Algorithms", 2000, www.ieee-infocom.org/2000/papers/700.pdf, 10 pages.
Vigna, "NetSTAT: A Network-based Intrusion Detection Approach", 1998, www.cs.ucsb.edu/~vigna/pub/vigna_kemmerer_acsac98.ps.gz, 10 pages.
Kung et al., "TCP Trunking for Bandwidth Management of Aggregate Traffic", 2000, www.eecs.harvard.edu/~htk/publication/2000-kung-wang-tcp-trunking-1100.pdf, pp. 1-12.
Parulkar, "An Architecture for Monitoring, Visualization and Control of Gigabit Networks", 1997, www.cs.wustl.edu/~schmidt/PDF/NMVC.pdf, pp. 1-21.
Kerbyson et al., "Modelling the performance of large-scale systems", IEE Proceedings-Software, vol. 150, No. 4, Aug. 2003, pp. 214-221.
Chieng, David et al., "Agent-Enhanced Dynamic Service Level Agreement in Future Network Environments", Lecture Notes in Computer Science, vol. 2216, Oct. 29-Nov. 1, 2001, pp. 299-312.
Bhoj, Preeti et al., "SLA Management in Federated Environments", HP Internet Systems and Applications Laboratory, Dec. 1998, pp. 1-12.
Fankhauser, George et al., "Service Level Agreement Trading for the Differentiated Services Architecture", Swiss Federal Institute of Technology, Computer Engineering and Networks Lab, Technical Report No. 59, Nov. 1999, pp. 1-17.
Liu, Zhen et al., "On Maximizing Service-Level-Agreement Profits", ACM Conference on Electronic Commerce, Oct. 14-17, 2001, pp. 213-223.
Interview Summary dated May 17, 2011 for U.S. Appl. No. 10/062,369, 4 pages.
Supplemental Response to Office Action filed May 17, 2011, U.S. Appl. No. 10/062,369, 16 pages.
"Perceptual evaluation of speed quality (PESQ), an objective method for end-to-end speech quality assessment of narrowband telephone networks and speech codecs", International Telecommunications Union, Recommendation P.862 (2001) (table of contents only) available at http://www.itu.int/rec/htmldoc.asp?doc=t%5Cp%5CT-REC-P.862-200102-I!!TOC-TXT-E.txt, 1 page.
"Voice Quality in IP Networks", Opticom Instruments, 2002, available from the web site of Opticom Instruments Inc., 3 pages.
"Voice Quality Testing for Wireless Networks", Opticom Instruments, 2001, available from the web site of Opticom Instruments Inc., pp. 1-23.
Michael Larson, "Probing Network Characteristics: a Distributed Network Performance Framework", Dr. Dobb's Journal, Jun. 2004, 6 pages.
Molta et al., "VoWLANs: Poised for Takeoff", Network Computing, Oct. 30, 2003, p. 49, available at www.nwc.com., 12 pages.
Vilho Raisanen, "Quality of Service & Voice-Over-IP", Dr. Dobb's Journal, May 2001, 10 pages.
Notice of Allowance mailed Aug. 18, 2011 for U.S. Appl. No. 10/062,369, 7 pages.

* cited by examiner

GRAPHICS FOR END TO END COMPONENT MAPPING AND PROBLEM-SOLVING IN A NETWORK ENVIRONMENT

This application is a continuation of application Ser. No. 10/125,619, filed Apr. 18, 2002, status allowed now U.S. Pat. No. 7,412,502.

CROSS-REFERENCES TO RELATED APPLICATIONS, AND COPYRIGHT NOTICE

The present application is related to co-pending applications entitled Methods and System for Probing in a Network Environment, application Ser. No. 10/062,329, filed on Jan. 31, 2002, now U.S. Pat. No. 7,043,549, Method and System for Performance Reporting in a Network Environment, application Ser. No. 10/062,369, filed on Jan. 31, 2002, now U.S. Pat. No. 8,086,720, and End to End Component Mapping and Problem-Solving in a Network Environment, filed on even date herewith. These co-pending applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to graphics for end to end component mapping and problem-solving, for information handling in a network environment.

BACKGROUND OF THE INVENTION

Various approaches have been proposed for monitoring, simulating, or testing web sites. Examples include U.S. Pat. No. 6,278,966 B1 (Howard, et al., Aug. 21, 2001), "Method and System for Emulating Web Site Traffic to Identify Web Site Usage Patterns." However, this example addresses substantially different problems (problems of simulation and hypothetical phenomena), and thus is significantly different from the present invention. Other examples include U.S. Pat. No. 6,078,956 (Bryant, et al., Jun. 20, 2000) and U.S. Pat. No. 5,787,254 (Maddalozzo, et al., Jul. 28, 1998). Other examples include services available from vendors such as Atesto Technologies Inc., Keynote Systems, and Mercury Interactive Corporation. These services may involve a script that runs on a probe computer. The examples mentioned above do not necessarily provide graphical tools for directing problem-solving efforts toward a component that is causing a problem.

When a problem occurs, lack of useful information can hamper efforts to restore the proper performance of an application in a network environment. These applications may involve many hardware and software components, so it may be difficult to quickly identify a component that is causing a problem. Thus there is a need for tools that quickly identify the cause of an outage at the component level, and properly focus problem-solving efforts for applications in a network environment, including but not limited to web sites and web services.

SUMMARY OF THE INVENTION

An example of a solution to problems mentioned above comprises: receiving as input at least one event (chosen from an event generated by an application probe, and an event generated by a component probe), and providing graphical output based on said inputs, whereby a user correlates a component problem with a performance problem affecting an application. Another example of a solution comprises: receiving component identifiers as input, receiving event identifiers as input, and providing a graphical representation of a hierarchy containing items chosen from:

a business process;
an application;
an event generated by an application probe;
a hardware component;
a software component; and
an event generated by a component probe.

The solutions provided here address the need to quickly understand the business impact of an outage, the need to quickly identify the cause of an outage at the component level, and the need to give high priority to problems with components that affect multiple business processes, for example.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Figure 1:
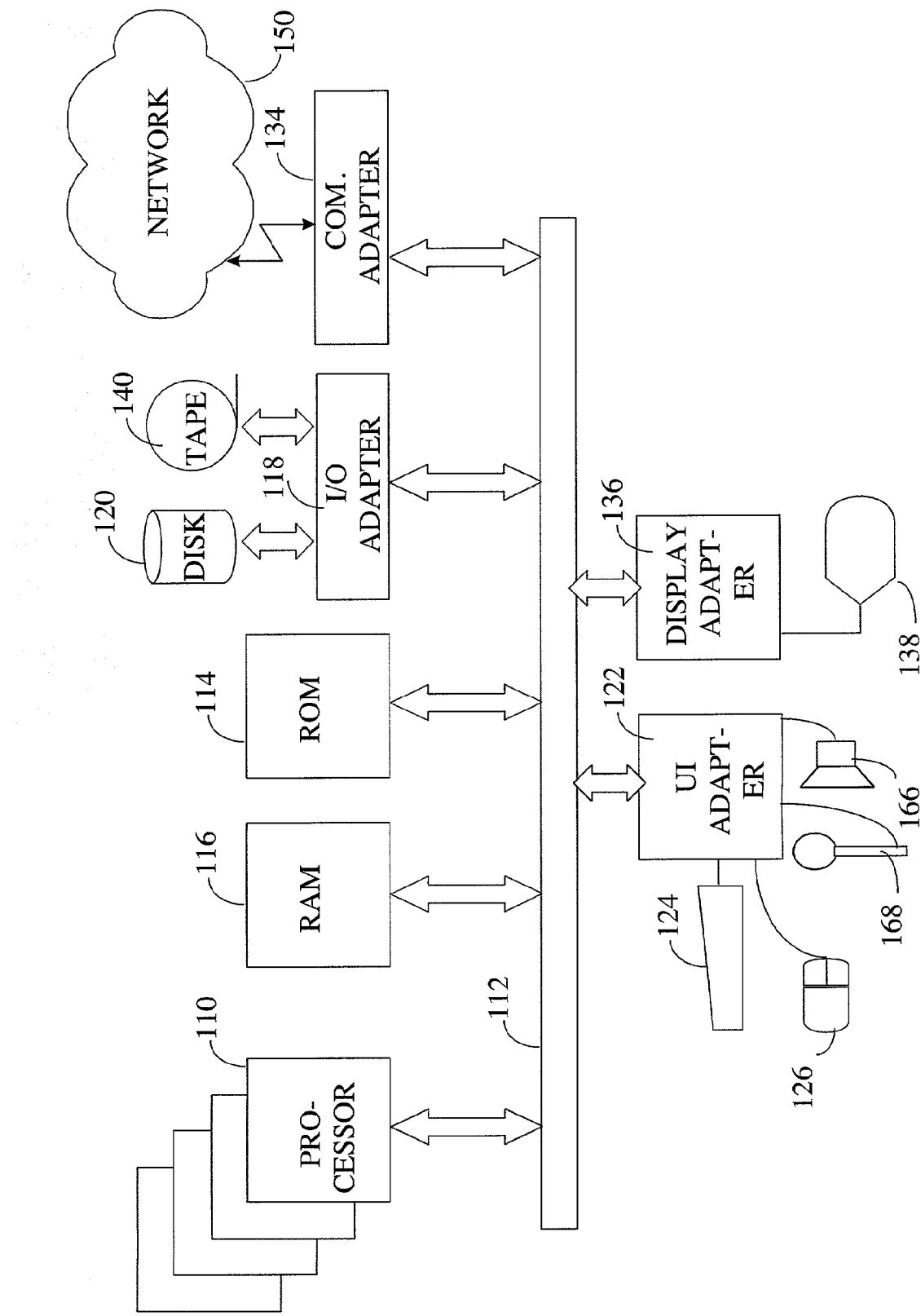
FIG. 1 illustrates a simplified example of an information handling system that may be used to practice the present invention.

The examples that follow involve the use of one or more computers and may involve the use of one or more communications networks. The present invention is not limited as to the type of computer on which it runs, and not limited as to the type of network used. The present invention is not limited as to the type of medium used for graphics. Means for providing graphical output may include sketching diagrams by hand on paper, printing images on paper, displaying images on a screen, or some combination of these, for example. A model of a solution might be provided on paper, and later the model could be the basis for a design implemented via computer, for example.

The following are definitions of terms used in the description of the present invention and in the claims:

"Availability" means ability to be accessed or used.

"Business process" means any process involving use of a computer by any enterprise, group, or organization; the process may involve providing goods or services of any kind.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a quantitative likeness or difference. "Comparing" may involve answering questions including but not limited to: "Is a measured response time greater than a threshold response time?" Or "Is a response time measured by a remote probe significantly greater than a response time measured by a local probe?"

"Component" means any element or part, and may include elements consisting of hardware or software or both.

"Computer-usable medium" means any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Event" means any action initiated by a computer or a user, including the sending of alerts, warnings, or other signals.

"Output" or "Outputting" means producing, transmitting, or turning out in some manner, including but not limited to printing on paper, or displaying on a screen, or using an audio device.

"Performance" means execution or doing; "performance" may refer to any aspect of an application's operation, including availability, response time, time to complete batch processing or other aspects.

"Probe" means any computer used in evaluating, investigating, or quantifying the functioning of a component or the performance of an application; for example a "probe" may be a personal computer executing a script, acting as a client, and requesting services from a server.

"Response time" means elapsed time in responding to a request or signal.

"Script" means any program used in evaluating, investigating, or quantifying performance; for example a script may cause a computer to send requests or signals according to a transaction scenario. A script may be written in a scripting language such as Perl or some other programming language.

"Service level agreement" means any oral or written agreement between provider and user. For example, "service level agreement" includes but is not limited to an agreement between vendor and customer, and an agreement between an information technology department and an end user. For example, a "service level agreement" might involve one or more client-server applications, and might include specifications regarding availability, response times or problem-solving.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Structured identifier" means any definition, label, tag, or other means of identifying something, with a certain arrangement or order.

"Threshold value" means any value used as a borderline, standard, or target; for example, a "threshold value" may be derived from a service level agreement, industry norms, or other sources.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
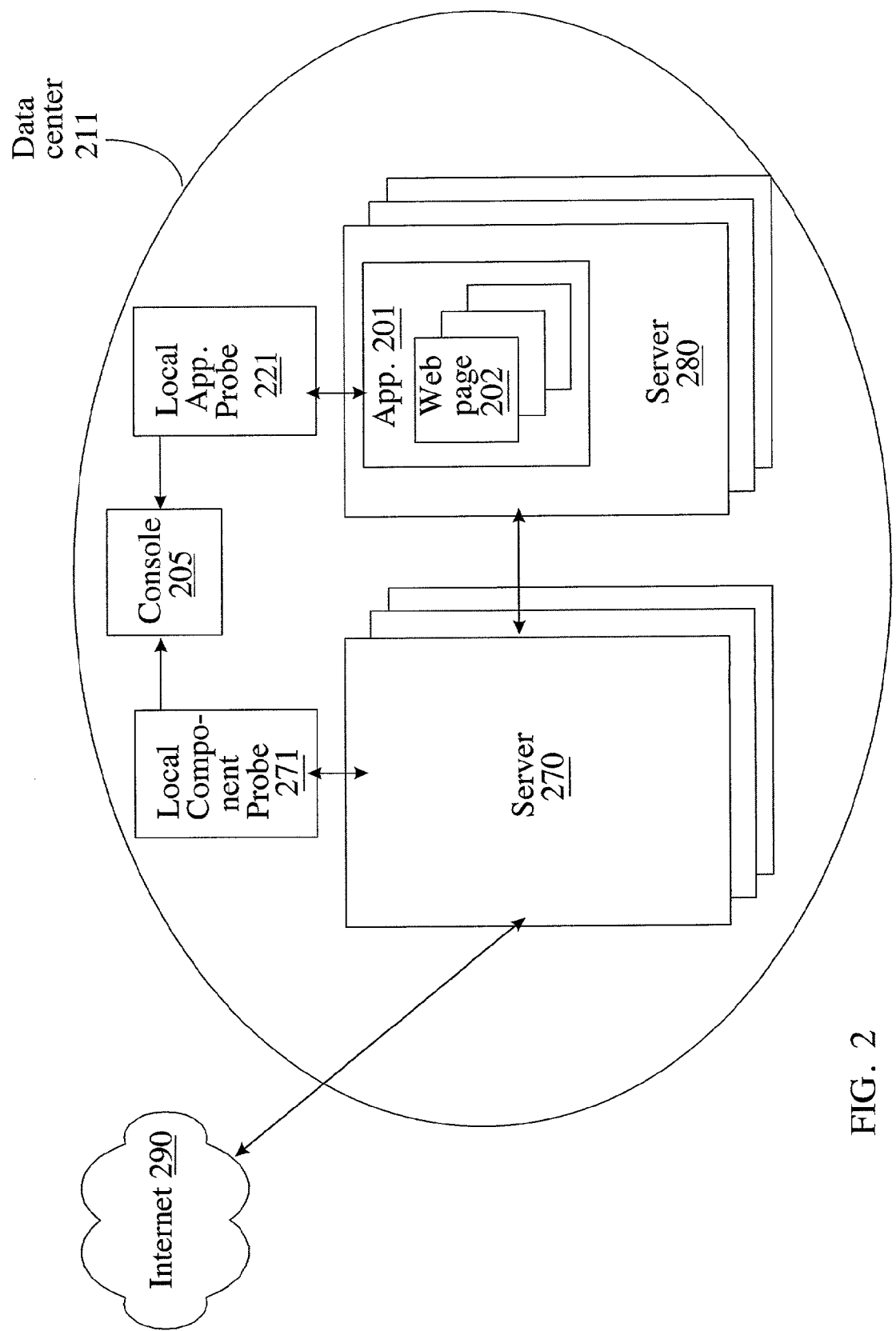
FIG. 2 is a block diagram illustrating one example of how the present invention was implemented in a data center that hosted a web site.

FIG. 2 is a block diagram illustrating one example of how the present invention was implemented in a data center that hosted a web site. FIG. 2 shows a simplified example of a typical ebusiness infrastructure, including a variety of network, server, and middleware components. These components are symbolized by server 270, server 280, and the boxes visible behind server 270 and server 280. As an overview, this example comprised: receiving as input events (symbolized by arrows pointing to console 205) generated by at least one application probe (shown at 221) and at least one component probe (shown at 271); and providing graphical output based on these inputs. FIG. 2 shows application probe 221 and component probe 271 providing input (symbolized by arrows) to console 205, which was used in providing graphical output, whereby a user could correlate a component problem (such as a problem with server 270) with a performance problem affecting an application (such as application 201).

Turning now to some details of the example implementation, application probes such as probe 221 measured response time for requests. The double-headed arrow connecting local application probe 221 with application 201 symbolizes requests and responses.

We located application probes locally at hosting sites (e.g. local application probe shown at 221, within data center 211) and remotely at relevant end-user sites (not shown in this diagram). This not only exercised the application code and application hosting site infrastructure, but also probed the ability of the application and network to deliver data from the application hosting site to the remote end-user sites. End-to-end measurement of IBM external applications (symbolized by application 201 with web pages 202) for customers or business partners, for example, involved remote application probes (RAP's) on the Internet (shown at 290). We also measured the availability and performance of the application at the location where it was deployed (local application probe shown at 221, within data center 211). This provided baseline performance measurement data, that could be used for analyzing the performance measurements from the remote probes (not shown in this diagram).

Local application probe 221 was implemented with a personal computer, utilizing IBM's Enterprise Probe Platform technology, but other kinds of hardware and software could be used. A local application probe 221 was placed on the IBM network just outside the firewall at the center where the web site was hosted. A local application probe 221 was used to probe one specific site per probe. There could be multiple scripts per site. A local application probe 221 executed the script every 20 minutes. Intervals of other lengths also could be used.

Component probe 271 could be implemented with a personal computer running a script, but other kinds of hardware and software could be used. Component probe 271 could be implemented with software products (such as those available from TIVOLI, for example, or other similar products). These products provide a framework for probing infrastructure components. These products are available for various operating systems and middle ware components.

Another aspect of this example in FIG. 2 was providing an alert (i.e. an event signaling a problem) when probe 221 or probe 271 detected an error. An example of an error in application 201 would be a measured response time value greater than a corresponding threshold value. For example, if a local application probe 221 encountered a problem (e.g. it was unable to access the site or unable to complete the script) on two consecutive executions of the script, local application probe 221 generated a real time alert (problem event, symbolized by arrow pointing to console 205), and sent it to a TIVOLI management system (shown as console 205). Another similar kind of management system could be used. Thus an alert was provided via a system management computer. An alert message via email also could be used. Similarly, component probe 271 generated a problem event (symbolized by arrow pointing to console 205) when a component problem was detected.

Turning now to some details of providing input from a plurality of probes, Component Probes measure availability, utilization and performance of infrastructure components, including servers, LAN, and services. Local component probes (LCPS) may be deployed locally in hosting sites, service delivery centers or data centers (e.g. at 211).

Network Probes measure network infrastructure response time and availability. Remote Network Probes (RNPS) may be deployed in a local hosting site or data center (e.g. at 211) if measuring the intranet or at Internet Service Provider (ISP) sites if measuring the Internet.

Application Probes measure availability and performance of applications and business processes.

Local Application Probe (LAP): Application probes deployed in a local hosting site or data center (e.g. at 211) are termed Local Application Probes.

Remote Application Probe (RAP): An application probe deployed from a remote location is termed a Remote Application Probe.

The concept of "probe" is a logical one. Thus for example, implementing a local component probe could actually consist of implementing multiple physical probes.

Providing a script for an application probe would comprise defining a set of transactions that are frequently performed by end users. Employing a plurality of application probes would comprise placing at least one remote application probe (not shown in FIG. 2) at each location having a relatively large population of end users. Note that the Remote Application Probe transactions and Local Application Probe transactions should be the same transactions. The example measured all the transactions locally (shown at 221), so that the local application response time can be compared to the remote application response time. This can provide insight regarding application performance issues. End-to-end measurement of an organization's internal applications for internal customers will involve a RAP on an intranet, whereas end-to-end measurement of an organization's external applications for customers, business partners, suppliers, etc. will involve a RAP on the Internet (shown at 290). The example involved defining a representative transaction set, and deploying remote application probes at relevant end-user locations. (This simplicity is something that can only be appreciated when this example is contrasted with other more complicated models.) A benefit following from the simplicity of this example is that it is easily generalized to other environments besides web based applications. Application 201 may be any client-server application. Some examples are a web site, a web application, database management software, a customer relationship management system, an enterprise resource planning system, or an opportunity management business process where a client directly connects to a server.

The example in FIG. 2 comprised providing an alert when an error occurred. The alert may be provided via email, for example, or may be provided in real time via a network and a system management computer 205. A clearing message may be provided when the error no longer is detected. In the example shown in FIG. 2, local application probe 221 generated a real time alert (problem event), and sent it to a TIVOLI management system (shown as console 205). Another similar kind of management system could be used.

The local application probe 221 automatically sent events to the management console 205 used by the operations department. In the example solution, integration was provided with the TIVOLI MANAGEMENT ENVIRONMENT and the TIVOLI EVENT CONSOLE product. The example solution generated events from the local application probe 221, and the events were generated after two consecutive errors on the same step in the business process. This could then be adjusted to send an event on the first error, for even faster notification. The recommendation is to send events on the second occurrence initially and then adjust to sending the event on the first occurrence as the environment becomes more stable and better understood by the operational staff. The reason for the recommendation is that in a Web environment there are a number of things that can cause intermittent problems, and it is ultimately a business decision when to invoke problem determination procedures.

Consider the following example of a condition where an event was generated. This example involved probing a web site for selling computer hardware. There were executions of the probe script that failed on step two. (Regarding the steps involved, see Table 1 below.) The associated event sent to the TIVOLI ENTERPRISE CONSOLE had a severity of "Warning," and documented the failure of step two, where the probe was unable to log on to the web site. Note that the date and time is the local time from the probe. In the examples below, "CRT" refers to a type of probe technology used by IBM. An example of an alert follows.

Tivoli alert for CRT probe failure:
Tivoli CRT Alert—PC NA
WARNING (NAQS2 [LogonFailed/1])
PCNa—Partner Commerce North America CRT Monitor
tag:auth=crtGwaFw tag:message=PartnerCommerceNA https://ecna.partner.com
Step-NAQS2-failed: Logon failed.
tag:severity=WARNING
tag:slot hostname=d03bpec18.pinfo.com
tag:slot mail_svr=CVRM
tag:slot mta=ecna.partner.com
tag:slot probe_addr=NAQS2
tag:slot probe_date=07/21
tag:slot probe_time=19:58
tag:class=crt_event
tag:source=SENTRY It is useful to automatically close opened events if a subsequent business process is executed successfully. This allows the operational staff to direct time and efforts to those events that remain in "open" status. Below is an example of such an event which was used to automatically close the previously opened event. The event was reported as severity HARMLESS and with the appropriate rules defined on the TIVOLI ENTERPRISE CONSOLE the previously opened event would be closed. This HARMLESS event was generated when the probe successfully executed the script and was able to log on to the web site. An example of such an event follows.

Figure 3:
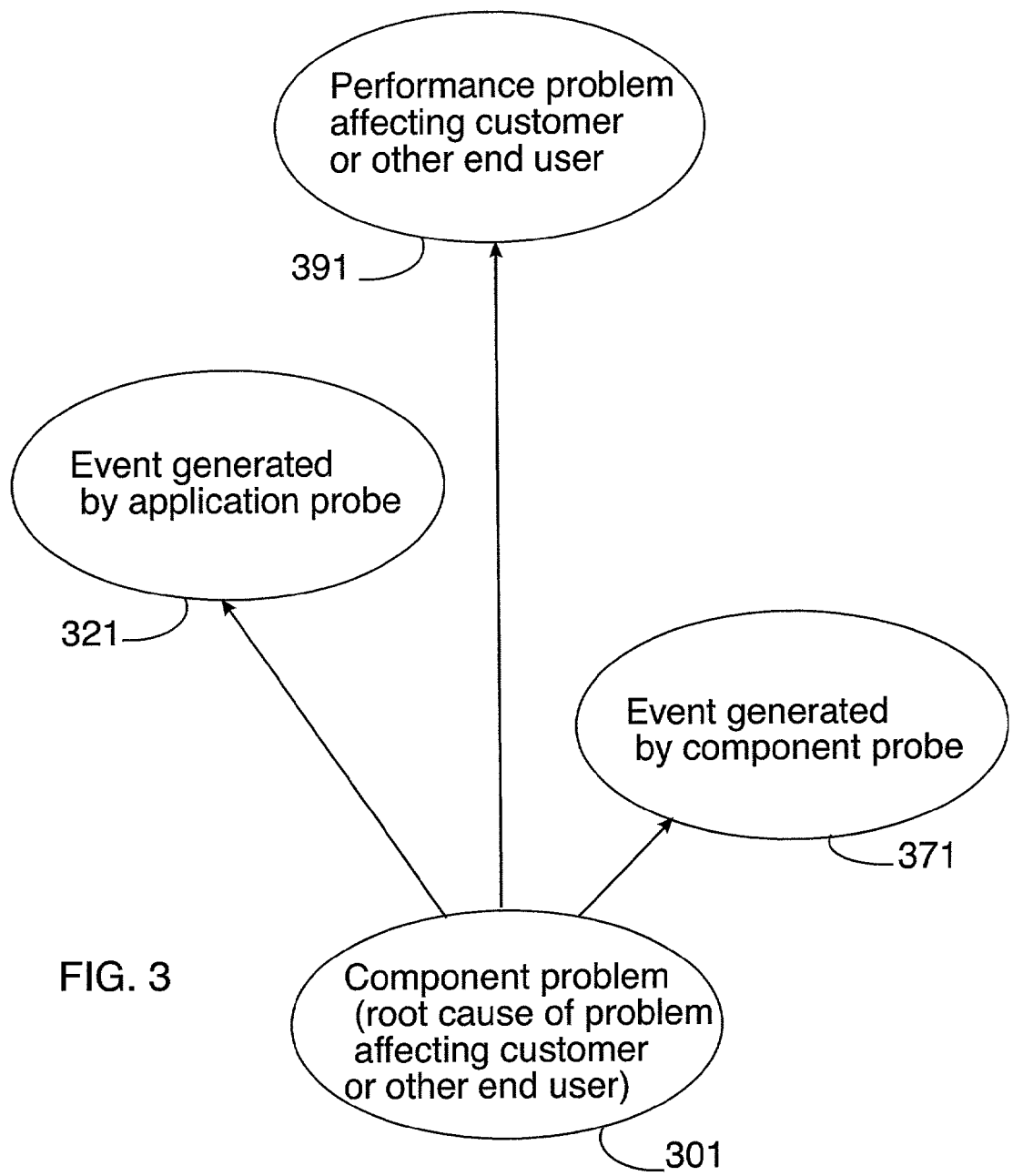
FIG. 3 is a diagram showing an example of identifying a problem with one or more components, according to the present invention.

Tivoli alert for CRT probe failure:
Tivoli CRT Alert—PC NA
HARMLESS (NAQS2 [RecoveredZf/0])
PCNa—Partner Commerce North America CRT Monitor
tag:auth=crtGwaFw
tag:message=PartnerCommerceNA https://ecna.partner.com
Step-NAQS2-failed: The problem causing the previous alert has been fixed.
tag:severity=HARMLESS
tag:slot hostname=d03bpec18.pinfo.com
tag:slot mail_svr=CVRM
tag:slot mta=ecna.partner.com
tag:slot probe_addr=NAQS2
tag:slot probe_date=07/21
tag:slot probe_time=21:43
tag:class=crt_event
tag:source=SENTRY FIG. 3 is a diagram showing an example of identifying a problem with one or more components, according to the present invention. FIG. 3 illustrates how a user (e.g. operational staff) may establish relationships among a component problem 301, events 321 and 371 generated by probes, and performance problem 391 affecting an application (and thus affecting a customer or other end user of the application.) Methods and systems are provided herein for assisting operational staff in reducing mean time to repair a component problem 301, and thus solve a performance problem 391, for example. In FIG. 3, a component problem 301 is a root cause of a performance problem 391, affecting an application. Component problem 301 is associated with events generated by probes: event 321, generated by an application probe, and event 371, generated by a component probe.

Event 321 signals that performance problem 391 exists with an application. For example, event 321 might be similar to the problem event described above regarding FIG. 2, where a probe was unable to log on to a web site; or event 321 might be generated when a "time out" problem is encountered at some transaction step. In this example, event 371 might alert operational staff that a disk failure has occurred on a server. In that case, component problem 301 would be a disk failure. Methods and systems are provided herein for correlating events such as event 321 and event 371.

FIG. 3 is one possible example of graphical output whereby a user may correlate component problem 301 with a performance problem 391 affecting an application. The example in FIG. 3 may involve component problem 301 causing a performance problem 391, that affects an application relied upon by a customer of a business. Thus the example in FIG. 3 may involve identifying component problem 301's impact on a business process that employs the component. Instead of a complete failure, performance problem 391 might be a response time that becomes too long to be acceptable for a customer. Such a situation might deserve intervention by operational staff before a complete failure occurs, depending on the importance of a business process that employs the component. Thus the example in FIG. 3 may involve directing problem-solving efforts, or identifying an opportunity to improve the performance of an application, whether or not a complete failure occurs.

Figure 4:
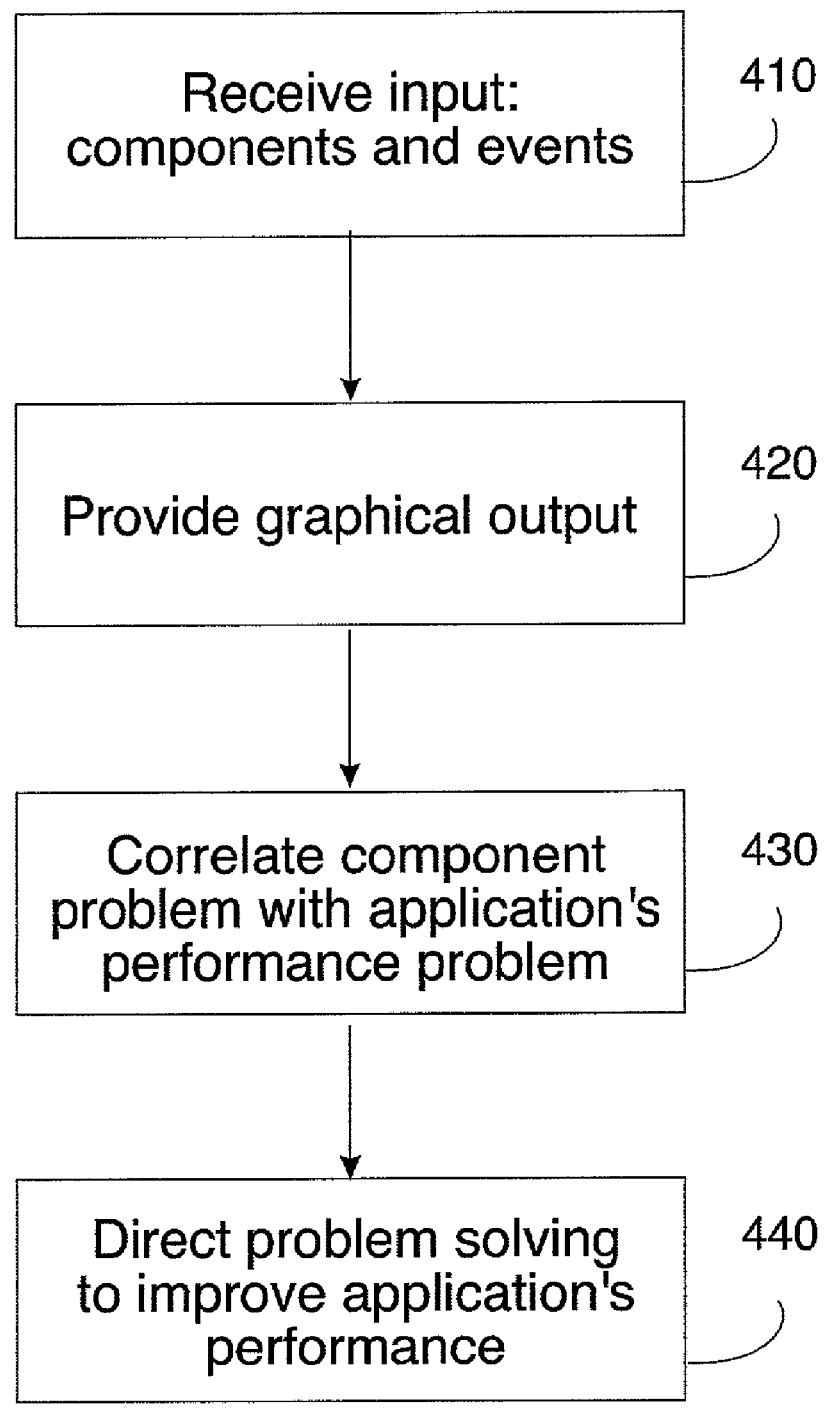
FIG. 4 is a flow chart illustrating one example of how graphics for end to end component mapping and problem solving may be implemented, and used to direct problem-solving.

FIG. 4 is a flow chart illustrating one example of how graphics for end to end component mapping and problem solving may be implemented, and used to direct problem-solving. This example is a brief overview that begins with receiving input regarding components and events, at block 410, followed by providing graphical output at block 420. Details of obtaining such input for graphical tools, and providing graphical output, will be discussed below. Next in this example is block 430, correlating a component's problem with an application's performance problem. An example of this is discussed below in connection with FIG. 6 (an example of visually linking an event reporting a component problem, a business process, and its components). Finally in this example is block 440, directing problem-solving efforts. Some examples of this are given below, in connection with FIGS. 5, 6, and 7. Directing problem-solving may involve identifying an opportunity to improve the performance of one or more applications by repairing specific components, or giving high priority to fixing problems with components that affect multiple business processes, for example.

Those skilled in the art will recognize that blocks in the above-mentioned flow chart could be arranged in a somewhat different order, but still describe the invention. Blocks could be added to the above-mentioned flow chart to describe details, or optional features; some blocks could be subtracted to show a simplified example.

Turning to details of obtaining input for graphical tools, we may begin with transaction steps in a business process. Some examples are steps involved in using a web site, a web application, web services, database management software, a customer relationship management system, an enterprise resource planning system, or an opportunity-management business process.

The following discussion involves an example of how a web site was analyzed and how inputs were developed for graphical tools. The discussion begins with transaction steps, then covers components and events. A tool used for looking at transaction steps was a table containing the transaction step number, step name, and a description of what action the end user takes to execute the step. Table 1 below is an example of such a table, based on a web site for selling computer hardware.

TABLE 1

| Step No. | Step name | Description |
| --- | --- | --- |
| NAQS1 | Open URL | Go to URL http:// |
| NAQS2 | Logon | Enter Login ID/Password. Click on Logon button. |
| NAQS3 | Navigation 1 | Click on Personal |

TABLE 1-continued

| Step No. | Step name | Description |
|---|---|---|
| NAQS4 | Clear Form | Systems and NETFINITY Select 'Clear the form'. Click "ok" on pop-up window. |
| NAQS5 | Select Catalog | Select Catalog Order from left hand navigation bar |
| NAQS6 | Select Printers | Select Printers |
| NAQS7 | Select Printer Model | Select Infoprint |
| NAQS8 | Add to Order | Type 1 in Quantity box for 1st item Click Add to Order, Click OK on pop-up window |
| NAQS9 | Display Order Form | Click on Go to order form |
| NAQS10 | Validate Order | Click Save/Validate Items |
| NAQS10A | Home Page | Click on "Overview" link |
| NAQS11 | Logoff | Click Logoff. Click "ok" on popup |

Another detail involved in obtaining inputs, at block 410, may be developing a script to run on a local application probe or remote application probe. Transaction steps such as those shown in Table 1 are primary candidates for use in developing a script.

Another tool for looking at transaction steps was a table containing the transaction step name, the name of an application supporting the step, and the data center where the application is hosted. Table 2 below is an example of such a table.

TABLE 2

| Step name | Supporting Application | Data center |
|---|---|---|
| Open URL | Application 1 | Boulder |
| Logon | Application 2 | Southbury |
| Navigation 1 | Application 1 | Boulder |
| Clear Form | Application 1 | Boulder |
| Select Catalog | Application 1 | Boulder |
| Select Printers | Application 1 | Boulder |
| Select Printer Model | Application 1 | Boulder |
| Add to Order | Application 1 | Boulder |
| Display Order Form | Application 1 | Boulder |
| Validate Order | Application 3 | Portsmouth |
| Home Page | Application 1 | Boulder |
| Logoff | Application 1 | Boulder |

Another detail involved in obtaining inputs, at block 410 in FIG. 4, is identifying components associated with the transaction steps; this may involve identifying application components and identifying infrastructure components. A variety of network, server, and middle ware components may be identified. This may include resources indirectly involved with transaction steps, such as a link to a back-end system providing data to web site. This link might only be used during the night to push new content to a web site. If the link becomes unavailable, the web site will contain incorrect data. This might cause customer dissatisfaction or loss of revenue. A tool used for looking at components was a table such as Table 3 below. It identifies infrastructure components that support the individual applications.

TABLE 3

| Application | Infrastructure dependencies | Middleware dependencies | Network dependencies |
|---|---|---|---|
| Application 1 | d0xx2111, d0xx2113, d0xx2115 | MQSeries Channel A | Link 9 |
| Application 2 | d0xx2112 | MQSeries Channel B | Link 9, Link 12 |
| Application 3 | d0xx2119 | DB/2 database Customer data | Link 15 |

In the examples considered here, typically the input for graphical tools would include at least one event generated by an application probe, and at least one event generated by a component probe. Obtaining input may comprise determining specifications to support the deployment of the probes. Determining specifications may further comprise determining a plurality of specifications such as: a resource specification; a threshold value specification; an event severity specification; and an event class specification. For example, a resource specification would define an infrastructure resource to be probed, such as file space used on a server. A threshold value specification might be "file space 80% full," for example. Examples of event severity specifications "warning" and "harmless" were given above in connection with FIG. 2. Regarding an event class specification, an infrastructure support team might address storage-related problems, and that team's console would be configured to receive the "sentry" class of events, for example. Various kinds of hardware and software resources would require various kinds of specifications to support the deployment of the probes.

Continuing with details of obtaining inputs (block 410 in FIG. 4), consider another example where inputs were developed for graphical tools. This example involved a business process for customer relationship management. A way of obtaining input for graphical tools was representing each of the components and each of the events with a structured identifier, where each of the identifiers has a limited number of parameters. The parameters typically would include depth, component name, parent component, business process name, and criticality. Other parameters could be used as well. Regarding the depth parameter, for example, one implementation used a hierarchy with a limited number of levels, where Level 0 was the highest level of a business process. Level 6, the lowest level, contained events generated by component probes (e.g. a component probe on server). Some examples of representing each component and each event with a structured identifier are shown below in Table 4. This example involved a business process for customer relationship management called "CRM2000," at Level 0. Each line in Table 4 contains the same business process name, "CRM2000." This allows correlating events, and allows identifying a component problem's impact on a business process that employs the component.

TABLE 4

Examples of structured identifiers for some components and events

| DEPTH/ LEVEL | NAME | PARENT COMPONENT | BUSINESS PROCESS NAME | CRITICALITY |
|---|---|---|---|---|
| 3 | Timeout | Open Leads | CRM2000 | Warning |
| 5 | d0xx | GWA | CRM2000 | Critical |
| 6 | Inetd | d0xx | CRM2000 | Critical |
| 6 | Disk failure | d0xx | CRM2000 | Critical |

Figure 5:
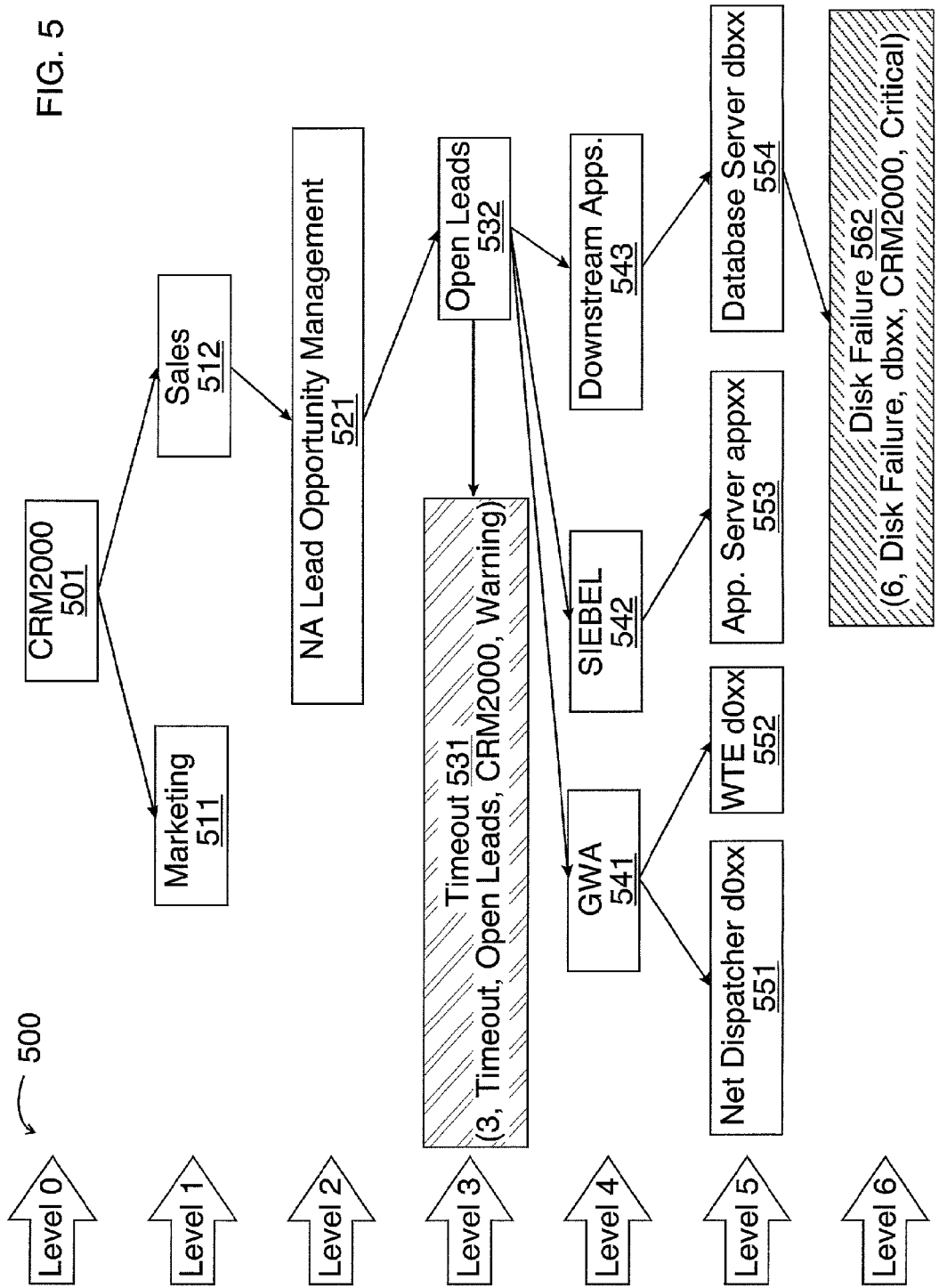
FIG. 5 shows one possible example of graphical output: a graphical representation of a hierarchy containing items such as a business process, an application, an event generated by an application probe, a hardware component, and an event generated by a component probe.

Table 4 shows an example using five parameters (depth, name, parent component, business process name, and criticality) to give a logical view of a business process, its components and events. (Features of this example are also shown in FIG. 5, as described below in more detail.) Component "d0xx" was a server. "Timeout" was an event generated by an application probe; "Inetd" and "Disk failure" were events generated by component probes.

The event "Inetd" indicated a problem with a software component (inetd, the Internet super-server daemon, in an operating system such as UNIX, LINUX, or IBM's AIX). The event "Disk failure" indicated a problem with a hardware component (a disk).

In contrast to Table 4, a structured identifier may be expressed in plain text, following this pattern, for example: (Depth, Component Name, Parent Component, Business Process Name, Criticality). For example a software component "inetd" could have the following identifier: (6, inetd, d0xx1, CRM2000, Critical). This identifier identifies the position of each component, and retains the data pertaining to its relationships and dependencies. The same software component "inetd," regarding its utilization in another application or business process called "CVRM," could have the following identifier: (6, inetd, d0xx1, CVRM, Critical).

FIG. 5 shows one possible example of graphical output: a graphical representation of a hierarchy containing items such as a business process, an application, an event generated by an application probe, a hardware component, and an event generated by a component probe. Typically such graphical output would be associated with inputs such as component identifiers and event identifiers.

The example in FIG. 5 involved the business process called CRM2000, described above, and involved some components and events shown in Table 4. This example used levels numbered from 0 to 6, seen at 500 in FIG. 5, along the vertical or "y" axis, representing a depth parameter. In Level 0 was the highest level of a business process, CRM2000, at block 501. This is an example of a general view of a business process, represented in a level at one extreme of a hierarchy. Level 1 contained components (subprocesses) of CRM2000: "Marketing" at block 511, and "Sales" at block 512. Level 2 contained a subprocess of Sales: a "North American Lead Opportunity Management" application at block 521, with a user interface utilized by end users. Level 3 contained transaction steps, (such as "Open Leads" at block 532) and events generated by application probes. "Timeout" at block 531 was an event generated by an application probe. This is an example of an event generated by an application probe being represented in an intermediate level of a hierarchy.

Level 4 contained logical components in the infrastructure, such as IBM's Global Web Architecture (GWA) at block 541, an environment that hosts web servers. Also represented at level 4, at block 542, was an environment that included an application (the software product sold under the trademark SIEBEL) and database servers supporting the application. The SIEBEL application was used as a front end application to many other applications supporting IBM business processes. These other applications are represented by "Downstream Apps." at block 543 in FIG. 5. Level 5 contained infrastructure components such as servers. Component "Net Dispatcher d0xx" at block 551, component "Web Traffic Express (WTE) d0xx" at block 552, component "App. Server appxx" at block 553, and component "Database Server dbxx" at block 554 were servers in this example. Level 6, the lowest level, contained events generated by component probes. "Disk failure" at block 562 was an event generated by a component probe. This is an example of a general view of a business process being represented in a level at one extreme of a hierarchy, and at least one event generated by a component probe being represented in a level at the opposite extreme of said hierarchy.

Continuing with further details of FIG. 5, events may be displayed in special colors, for example, or displayed with some other visual cue such as highlighting or a special symbol. In FIG. 5, a special color or other visual cue is shown by light shading, seen at block 531, or darker shading, seen at block 562. In one example, a "Timeout" event at block 531 was displayed in yellow, and a "Disk failure" event at block 562 was displayed in red. Yellow signified an information event or signified performance degradation. Red signified that a business process or component was impacted critically by a problem.

Continuing with further details of FIG. 5, the "Timeout" event at block 531 is a result of an error detection by the local application probe on the first step, "Open Leads" 532, of the "North American Lead Opportunity Management" 521. The step, "Open Leads" 532, involves looking up lead information for the customer from "Database Server dbxx" 554. "Disk failure" event 562 is identified by the local component probe.

One possible use of a graphical representation such as FIG. 5 is as a dependency diagram; it allows a user to understand relationships. For example, the step "Open Leads" 532 is dependent on three logical components in the infrastructure (Global Web Architecture (GWA) 541, the SIEBEL application 542, and "Downstream Apps." 543) and so in FIG. 5 "Open Leads" 532 is connected to 541, 542, and 543 by solid lines with arrowheads. The step "Open Leads" 532, involves looking up lead information for the customer from "Database Server dbxx" 554, and so in FIG. 5 "Open Leads" 532 is connected to 554 by solid lines with arrowheads, via "Downstream Apps." 543. Arrows or plain solid lines or other symbols may be used.

Another possible use of a graphical representation such as FIG. 5 is as a class diagram. A graphical representation such as FIG. 5 could be used in object-oriented design, modeling, or programming, employing Unified Modeling Language (UML), for example, or some other diagramming system. Arrows or plain solid lines or other symbols may be used, depending on the notation system.

Continuing with further details of FIG. 5, consider the levels numbered from 0 to 6, seen at 500 along the vertical axis, representing a depth parameter. Variations in the depth parameter are possible. Another example (not shown in a figure) used levels numbered from 0 to 7, where hardware and software classes of components were at Level 6, and the events "Inetd" and "Disk failure" were at Level 7.

Some examples of additional parameters that could be used with the five parameters shown above are problem determination, destination, and service level agreement parameters. First, an additional parameter for problem determination (PD) can be added. The purpose of this parameter would be to associate problem determination procedures to every event generated. This parameter could be used to identify the actions or procedures to be used when this event is generated. These actions or procedures can be automatic (e.g. identifying a program or function to be automatically executed when the event occurs). Another implementation could be to use this parameter as an index into an operational repository to retrieve written instructions to be followed to correct the problem. Depending on the missions of different organizations, the operational procedures will vary. In the example in Table 4, where we had a problem with the inetd daemon, the automated PD process could be to run the appropriate shell script to restart the inetd daemon. In the case of a disk crash, the operational procedure could be a reference to a document describing how to replace broken hardware and apply the necessary backup and restore procedures. On depth level 2 the PD parameter could refer to an automated or written process for how the business owner of the process is contacted and informed about the business impact of the infrastructure problem.

A second example would be to add a destination parameter to the event. Most likely several different teams are involved in the management of an end to end business process. These teams have different missions and accordingly different roles and responsibilities. For example an eBusiness Center could have a mission to manage the end to end process from a customer perspective and the service delivery centers could perform traditional information technology services. The destination (i.e. a target audience or event console) parameter could be used to indicate that the event documenting the disk crash has been sent to an event console used by the service delivery center with a responsibility to address infrastructure problems. The service delivery center may receive the disk crash event as CRITICAL. The same event could be sent to different destinations with different values in the criticality parameter, depending on the roles and responsibilities of the target audience. The disk crash event could be sent to the eBusiness Command Center and could have a criticality value of WARNING.

Thirdly, Service Level Agreements (SLA's) are most likely in place for the whole end to end system and in many cases the individual components. Adding an SLA parameter would allow this parameter to be used as an index into a repository of existing SLA's. Again, these SLA's differ based on the missions of the organizations, so the end to end SLA documents the availability agreement for the customer process, and the SLA for infrastructure documents hardware availability etc. Since these SLA's are commitments by the service providers and could impose penalties, it is useful to direct problem resolution activities in accordance with the service level commitments. More sophisticated implementations could include automatic data collection for SLA attainment calculations.

In various situations, various combinations of these parameters may be used. For example, an enterprise could use the problem determination parameter but not the SLA parameter (they may not have an SLA). Another situation could be an enterprise who has an SLA but has not implemented automated or manual operational processes in support of their SLA commitments.

Figure 6:
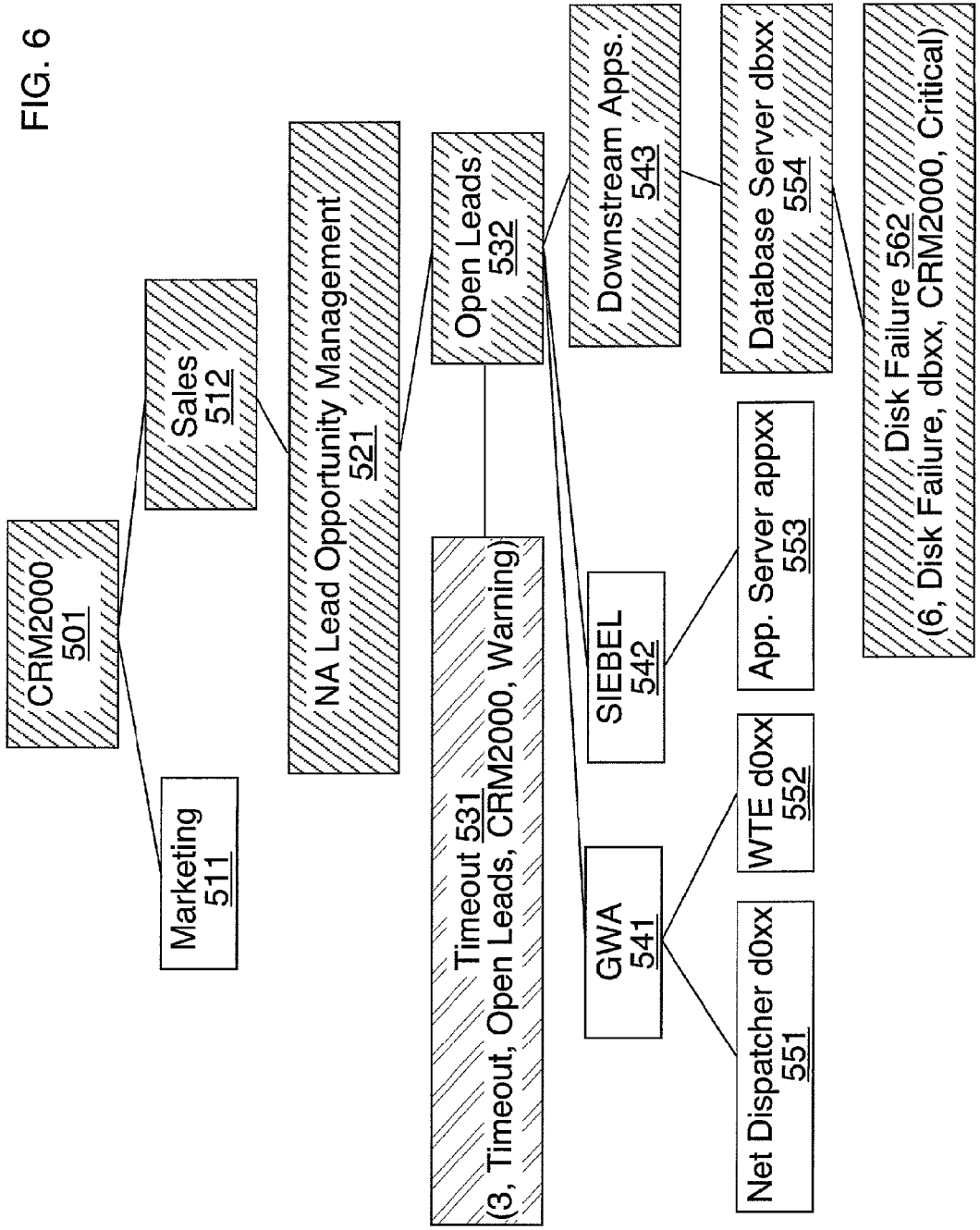
FIG. 6 shows another example of graphical output, whereby a user correlates a component problem with a performance problem affecting an application.

FIG. 6 shows another example of graphical output, whereby a user correlates a component problem with a performance problem affecting an application. FIG. 6 provides a graphical representation of relationships among a business process and its components. FIG. 6 continues the example of the business process called CRM2000, at 501. The figure also shows an event generated by an application probe (Timeout 531) and an event generated by a component probe (Disk Failure 562) that allow high level business impact analysis. The events graphically represented here could also be viewed from other operational consoles.

The elements shown in FIG. 6 were described above in connection with FIG. 5. As in FIG. 5, a special color or other visual cue is shown in FIG. 6 by light shading, seen at block 531, or darker shading, seen at block 562. In one example, a "Timeout" event at block 531 was displayed in yellow. Yellow signified an information event or signified performance degradation. Grey signified no impact (shown in FIG. 6 by a block with no shading, such as block 511). Other color schemes could be used instead.

Continuing with the color coding in FIG. 6, red signified that a business process or component was impacted critically by a problem. For example, "Open Leads" 532, was among those displayed in red, shown in FIG. 6 by darker shading. Actually the darker shading extends upward from a "Disk failure" event at block 562, including blocks 554, 532, 521, 512, and 501. In this example, the color of the most critical event is propagated upward. This example provides a visual linking of an event reporting a component problem (block 562), a business process (block 501), and its components, whereby a user correlates a component problem with a performance problem affecting an application. Thus a user may direct problem-solving efforts, based on graphical output.

Figure 7:
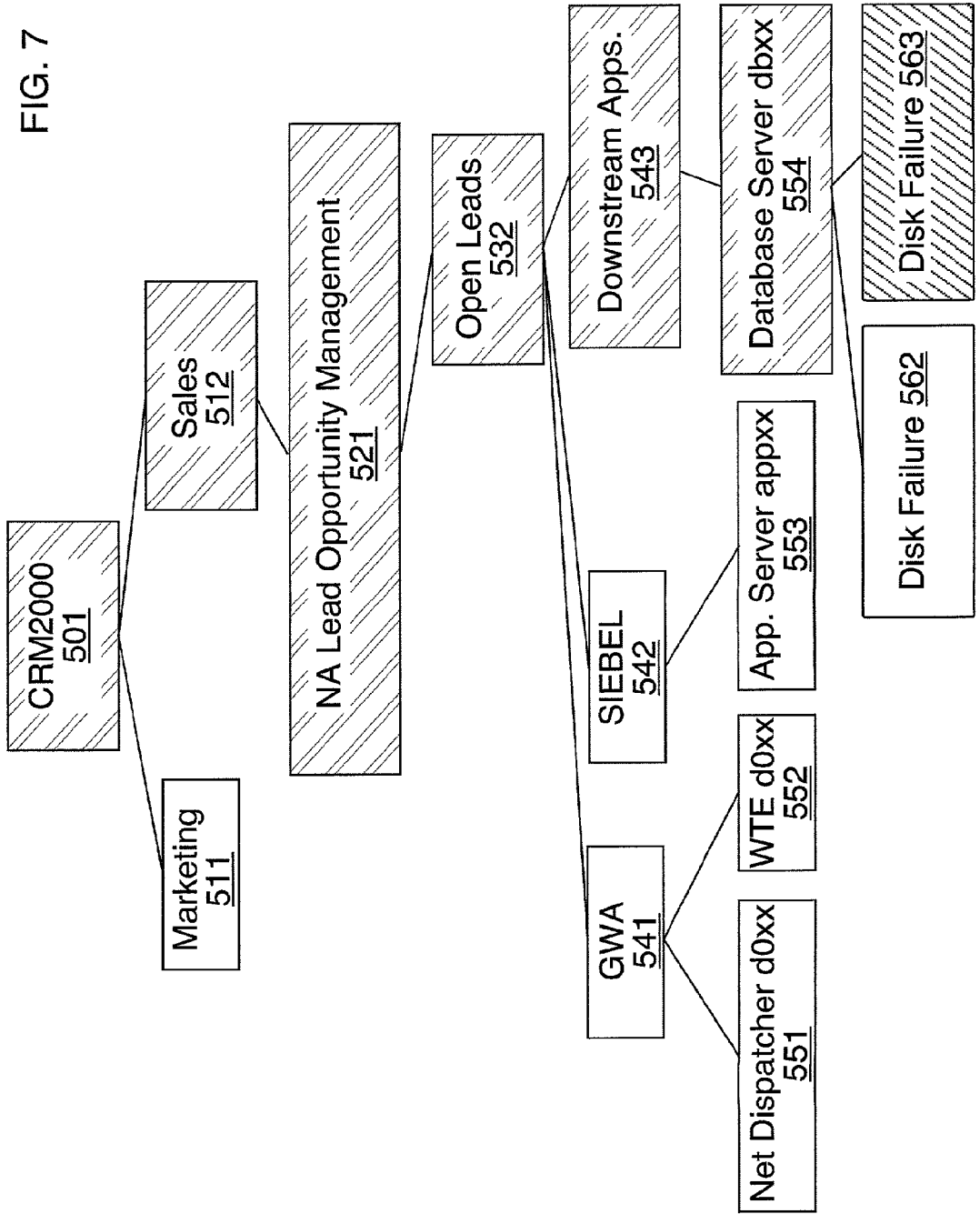
FIG. 7 shows another example of graphical output, providing an example of aggregating component status and an example involving performance degradation.

FIG. 7 shows another example of graphical output, providing an example of aggregating component status and an example involving performance degradation. As an overview, FIG. 7 involves receiving as input at least one event (chosen from an event generated by an application probe, and an event generated by a component probe), and providing graphical output based on said inputs, whereby a user correlates a component problem with a performance problem affecting an application.

FIG. 7 continues the example of the business process called CRM2000, at 501. The elements and shading scheme shown in FIG. 7 were described above in connection with FIG. 5, except that the lowest level of FIG. 7 contains a second "Disk failure" event at block 563, in addition to the "Disk failure" event at block 562. In this example, the lowest level of FIG. 7 contains all the events that can be generated from one or more local component probes. "Disk failure" 562 is an event that can be generated by a probe if a problem is detected with one disk, and "Disk failure" 563 is an event that can be generated by a probe if a problem is detected with another disk.

In the example in FIG. 7, there are two disks, and a problem is detected with one disk. "Disk failure" 563 is an event that actually is generated by a probe and thus is displayed in red, shown in FIG. 7 by darker shading. Thus FIG. 7 shows an event 562 potentially generated by a component probe, and an event 563 actually generated by a component probe. As in FIG. 5, a special color or other visual cue is shown by light shading or darker shading. Other color schemes could be used instead.

In the example in FIG. 7, a system administrator could identify performance degradation caused by a specific component, and take proactive measures to avoid more serious problems. From the business process point of view, there is a degradation of service but not a critical error condition affecting end users. In this scenario, the business process is still available. The performance problem is not yet severe enough for an application probe to generate an event, so Timeout 531 is missing from FIG. 7, compared to FIGS. 5 and 6. Yellow coloring, shown in FIG. 7 by light shading, extends upward from block 554 to blocks 532, 521, 512, and 501. In this example, the light shading signifying performance degradation is propagated upward. This is an example of aggregating component status through the hierarchy.

Turning to implementation and use of graphical outputs, graphics similar to the examples in FIGS. 6 and 7 were implemented by using the software product sold under the trademark TIVOLI BUSINESS SYSTEMS MANAGER by Tivoli Systems Inc. Other similar software could be used instead, such as the software product sold under the trademark HP OPENVIEW by Hewlett-Packard Co. for example. A logical view like the example in FIG. 5 was useful in implementing graphical outputs. Five-parameter structured identifiers for components (like the examples shown in Table 4) were used as input to the development of the graphical outputs. A five-parameter structured identifier retained relationship information, and tools like TIVOLI BUSINESS SYSTEMS MANAGER had a script that parsed this information.

In another example of graphics (not shown here), elements of a hierarchy were arranged diagonally, descending from left to right. Elements were connected by plain solid lines. Classes of components were represented by file-folder symbols. This example used levels numbered from 0 to 7, where hardware and software classes of components were at Level 6, and events like "Inetd" and "Disk failure" were at Level 7. Additional levels could be defined within tools like TIVOLI BUSINESS SYSTEMS MANAGER to group components for easier administration. This example was essentially a component view.

Another example of graphics (not shown here) was essentially an application view, showing one or more applications and events generated by an application probe. In contrast, the examples seen in FIGS. 5 and 6 are combination views, comprising views of applications and views of components.

Graphics like those described above were useful to administrators who, for example, provide support for a business process. Such graphics addressed administrators' need to quickly understand the business impact of an outage, the need to quickly identify the root cause of an outage at the component level, and the need to give high priority to problems with components that affect multiple business processes. In conclusion, we have shown examples of graphics for end to end component mapping and problem-solving in a network environment.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A system comprising a processor, a computer-readable memory coupled to the processor, and a computer-readable tangible storage device coupled to the processor, said computer-readable tangible storage device containing program code configured to be executed by the processor via the computer-readable memory to implement a method for mapping, said method comprising:
   said processor receiving as input at least one component identifier representing at least one of a hardware component or a software component, wherein each component identifier comprises a depth parameter, a component name parameter, and a parent component parameter;
   said processor receiving as input at least one event identifier representing at least one event chosen from:
      an event generated by an application probe; and
      an event generated by a component probe, wherein each event identifier comprises a depth parameter, an event name parameter, and a parent component parameter; and
   said processor providing graphical output based on said at least one component identifier and said at least one event identifier, wherein:
      said providing a graphical output comprises providing a graphical representation of a hierarchy containing separate graphical objects representative of the at least one event, and at least one of a hardware component or a software component whereby a user correlates a component problem with a performance problem affecting an application based on the graphical output,
      said component problem is associated with said at least one event,
      a general view of a business process is represented in a level at one extreme of said hierarchy,
      at least one event generated by a component probe is represented in a level at the opposite extreme of said hierarchy from the level at which the general view of the business process is represented, and
      at least one event generated by an application probe is represented in an intermediate level of said hierarchy between the general view of the business process and the at least one event generated by the component probe, and
   wherein said providing graphical output further comprises:
      providing an axis representing the depth parameter of the component identifier and the depth parameter of the event identifier, wherein graphical objects representative of the at least one event and the at least one of the hardware component or the software component are arranged along the axis according to their corresponding depth parameter in their corresponding component or event identifier.

2. The system of claim 1, said method further comprising:
   said processor directing problem-solving efforts, based on said graphical output.

3. The system of claim 1, wherein said providing graphical output further comprises:
   providing graphical representations of items chosen from:
   a business process; and
   an application.

4. The system of claim 1, wherein said providing graphical output further comprises:
providing an axis representing a depth parameter.

5. The system of claim 1, wherein said hierarchy includes between six and eight levels, inclusively.

6. The system of claim 1, wherein said providing graphical output further comprises:
providing a class diagram.

7. The system of claim 1, wherein said providing graphical output further comprises:
providing one or more views chosen from:
an application view;
a component view; and
a combination view.

8. A computer program product having a computer-readable tangible storage device with computer-executable instructions stored thereon, said computer-executable instructions being executable by a computer system having a processor to implement a method for mapping, said method comprising:
the computer system receiving as input at least one component identifier representing at least one of a hardware component or a software component, wherein each component identifier comprises a depth parameter, a component name parameter, and a parent component parameter;
the computer system receiving as input at least one event identifier representing at least one event chosen from:
an event generated by an application probe; and
an event generated by a component probe, wherein each event identifier
comprises a depth parameter, an event name parameter, and a parent component parameter; and
the computer system providing graphical output based on said at least one component identifier and said at least one event identifier, wherein:
said providing a graphical output comprises providing a graphical representation of a hierarchy containing separate graphical objects representative of the at least one event, and at least one of a hardware component or a software component whereby a user correlates a component problem with a performance problem affecting an application based on the graphical output,
said component problem is associated with said at least one event,
a general view of a business process is represented in a level at one extreme of said hierarchy,
at least one event generated by a component probe is represented in a level at the opposite extreme of said hierarchy from the level at which the general view of the business process is represented, and
at least one event generated by an application probe is represented in an intermediate level of said hierarchy between the general view of the business process and the at least one event generated by the component probe, and
wherein said providing graphical output further comprises:
providing an axis representing the depth parameter of the component identifier and the depth parameter of the event identifier, wherein graphical objects representative of the at least one event and the at least one of the hardware component or the software component are arranged along the axis according to their corresponding depth parameter in their corresponding component or event identifier.

9. The computer program product of claim 8, said method further comprising:
the computer system directing problem-solving efforts, based on said graphical output.

10. The computer program product of claim 8, wherein said providing graphical output further comprises:
providing graphical representations of items chosen from:
a business process; and
an application.

11. The computer program product of claim 8, wherein said providing graphical output further comprises:
providing an axis representing a depth parameter.

12. The computer program product of claim 8, wherein said hierarchy includes between six and eight levels, inclusively.

13. The computer program product of claim 8, wherein said providing graphical output further comprises:
providing a class diagram.

14. The computer program product of claim 8, wherein said providing graphical output further comprises:
providing one or more views chosen from:
an application view;
a component view; and
a combination view.

* * * * *